United States Patent
Masters et al.

(10) Patent No.: US 9,618,142 B2
(45) Date of Patent: Apr. 11, 2017

(54) SYSTEMS AND METHODS FOR SUPPORTING TUBULAR MEMBERS

(75) Inventors: Blake R. Masters, Houston, TX (US); Rodney H. Masters, Houston, TX (US); Mikael W. Smith, Kingwood, TX (US); Billy L. Griffith, Spring, TX (US)

(73) Assignee: ASSET INTEGRITY MANAGEMENT SOLUTIONS, L.L.C., Houston, TX (US)

( * ) Notice: Subject to any disclaimer, the term of this patent is extended or adjusted under 35 U.S.C. 154(b) by 305 days.

(21) Appl. No.: 13/392,329

(22) PCT Filed: Aug. 25, 2010

(86) PCT No.: PCT/US2010/046652
§ 371 (c)(1),
(2), (4) Date: Feb. 24, 2012

(87) PCT Pub. No.: WO2011/025827
PCT Pub. Date: Mar. 3, 2011

(65) Prior Publication Data
US 2012/0152870 A1    Jun. 21, 2012

Related U.S. Application Data

(60) Provisional application No. 61/236,832, filed on Aug. 25, 2009.

(51) Int. Cl.
*F16L 3/14*    (2006.01)
*F16L 3/22*    (2006.01)
*A47B 81/00*   (2006.01)

(52) U.S. Cl.
CPC .............. *F16L 3/14* (2013.01); *A47B 81/007* (2013.01); *F16L 3/22* (2013.01)

(58) Field of Classification Search
CPC .... A47F 7/0021; A47F 7/0035; A47F 7/0028; A47F 7/17; A47F 7/175; A47B 81/007; F16L 3/14; F16L 3/233; F16L 3/23; F16L 3/22; F16L 3/02; F16L 3/006; F16L 3/04; F16L 3/26
USPC ........ 211/60.1, 70.4, 85.18, 85.29, 113, 118, 211/119.01; 248/60, 58, 59; 410/32, 34, 410/36, 37
See application file for complete search history.

(56) References Cited

U.S. PATENT DOCUMENTS

| | | | | |
|---|---|---|---|---|
| 501,439 | A | * | 7/1893 | Reznor ........................... 248/71 |
| 861,887 | A | * | 7/1907 | Peirce ............................ 248/61 |
| 1,193,480 | A | * | 8/1916 | O'Day ............................ 248/55 |
| 1,642,005 | A | * | 9/1927 | Arnstein ....................... 248/318 |
| 1,750,798 | A | * | 3/1930 | Monroe ..................... 414/22.63 |

(Continued)

FOREIGN PATENT DOCUMENTS

| | | | | |
|---|---|---|---|---|
| DE | 3218007 A1 | * | 11/1983 | ................ F16L 3/14 |
| DK | WO 9608063 A1 | * | 3/1996 | ............... H02G 3/03 |

(Continued)

*Primary Examiner* — Stanton L Krycinski
(74) *Attorney, Agent, or Firm* — Edmonds & Cmaidalka

(57) ABSTRACT

Systems and methods for supporting one or more tubular members are provided. The system can include a frame and one or more flexible support members, each having a first end and a second end. The first ends and the second ends can be connected to the frame to provide one or more supports for one or more tubular members.

30 Claims, 8 Drawing Sheets

(56) References Cited

U.S. PATENT DOCUMENTS

| | | | | |
|---|---|---|---|---|
| 1,772,902 | A * | 8/1930 | Knowlton et al. | 410/98 |
| 2,218,316 | A * | 10/1940 | Moon | 410/36 |
| 2,269,286 | A * | 1/1942 | Ekern | 410/97 |
| 2,291,148 | A * | 7/1942 | Carson | 248/58 |
| 2,300,059 | A * | 10/1942 | Perry | 410/36 |
| 2,319,832 | A * | 5/1943 | Trochim | 248/60 |
| 2,339,564 | A * | 1/1944 | Goldberg et al. | 248/62 |
| 2,339,565 | A * | 1/1944 | Goldberg et al. | 248/62 |
| 2,423,455 | A * | 7/1947 | Larson | 248/71 |
| 2,549,239 | A | 4/1951 | Robertson et al. | |
| 2,579,240 | A * | 12/1951 | Masoner | 248/317 |
| 2,746,703 | A * | 5/1956 | Emery | 248/150 |
| 2,749,852 | A * | 6/1956 | Bulluck | 410/48 |
| 2,913,125 | A * | 11/1959 | Burtenshaw | 211/60.1 |
| 3,098,567 | A * | 7/1963 | Steel | 211/49.1 |
| 3,165,205 | A * | 1/1965 | Travis, Jr. | 211/60.1 |
| 3,175,693 | A * | 3/1965 | Steel | 211/49.1 |
| 3,204,901 | A * | 9/1965 | Dunu | 248/74.3 |
| 3,224,385 | A * | 12/1965 | Elsner | 410/117 |
| 3,266,761 | A * | 8/1966 | Walton et al. | 248/71 |
| 3,458,215 | A * | 7/1969 | Maradyn | 410/37 |
| 3,965,938 | A * | 6/1976 | Bauerle et al. | 138/107 |
| 3,993,344 | A * | 11/1976 | Bennett | 410/36 |
| 4,061,391 | A * | 12/1977 | Violette | 410/68 |
| 4,080,998 | A * | 3/1978 | Mottola et al. | 137/107 |
| 4,099,617 | A * | 7/1978 | Nist, Jr. | 206/443 |
| 4,175,666 | A * | 11/1979 | Smith | 211/85.18 |
| 4,247,009 | A * | 1/1981 | Vaurigaud | 211/60.1 |
| 4,266,745 | A * | 5/1981 | Jones | 248/58 |
| 4,293,155 | A | 10/1981 | Grant | |
| 4,338,045 | A * | 7/1982 | Cour | F16L 1/20 138/105 |
| 4,358,232 | A * | 11/1982 | Griffith | 410/100 |
| 4,406,434 | A * | 9/1983 | Schneckloth | B60R 15/00 248/49 |
| 4,465,400 | A | 8/1984 | Adams | |
| 4,529,345 | A * | 7/1985 | Van Gompel | 410/42 |
| 4,846,610 | A * | 7/1989 | Schoenleben | 410/96 |
| 4,941,630 | A * | 7/1990 | Albano | 248/71 |
| 5,005,789 | A * | 4/1991 | Jones | 248/58 |
| 5,027,960 | A * | 7/1991 | Rainville | 211/118 |
| 5,123,547 | A | 6/1992 | Koch | |
| 5,154,556 | A * | 10/1992 | Wappel | 410/36 |
| D338,827 | S * | 8/1993 | Rumble | D8/380 |
| 5,649,632 | A | 7/1997 | Terashima et al. | |
| 6,030,158 | A * | 2/2000 | Tatina et al. | 410/100 |
| 6,032,907 | A * | 3/2000 | Santa Cruz et al. | 248/60 |
| 6,135,397 | A * | 10/2000 | Santa Cruz et al. | 248/74.1 |
| 6,202,962 | B1 * | 3/2001 | Snyder | 248/60 |
| 6,224,024 | B1 * | 5/2001 | Fritz | 248/55 |
| 6,557,805 | B1 * | 5/2003 | Snyder | 248/60 |
| 7,083,151 | B2 * | 8/2006 | Rapp | 248/60 |
| 7,131,803 | B2 | 11/2006 | Guarisco, Sr. | |
| 7,186,066 | B2 * | 3/2007 | Bohac et al. | 410/98 |
| 7,306,414 | B2 * | 12/2007 | Bohac et al. | 410/36 |
| 8,235,331 | B2 * | 8/2012 | McIntosh | 248/58 |
| 8,857,771 | B2 * | 10/2014 | Streetman | F16R 3/133 248/228.1 |
| 2003/0164347 | A1 * | 9/2003 | Bouvier, Jr. | 211/117 |
| 2004/0057808 | A1 | 3/2004 | Segura | |
| 2005/0279893 | A1 * | 12/2005 | Rapp | 248/74.3 |
| 2005/0284988 | A1 * | 12/2005 | Lawver | F16L 3/24 248/65 |
| 2007/0170334 | A1 * | 7/2007 | Ambrose | 248/317 |

FOREIGN PATENT DOCUMENTS

| | | | | |
|---|---|---|---|---|
| FR | 2497848 A1 * | 7/1982 | | E01D 19/103 |
| GB | 300769 A * | 11/1928 | | F16B 2/06 |

* cited by examiner

SYSTEMS AND METHODS FOR SUPPORTING TUBULAR MEMBERS

CROSS REFERENCE TO RELATED APPLICATION

This application claims the benefit of PCT Application No. PCT/US2010/046652, filed on Aug. 25, 2010, which claims the benefit of U.S. Provisional Patent Application having Ser. No. 61/236,832, filed on Aug. 25, 2009. The entirety of each application is incorporated by reference herein.

BACKGROUND

Field

Embodiments of the present disclosure generally relate to systems and methods for supporting tubular members. More particularly, embodiments relate to systems and methods for supporting nested tubular members.

Description of the Related Art

Natural gas is predominantly transported in gaseous form via pipeline from a point of production to a point of distribution. It is typically not feasible, however, to transport stranded or remote natural gas deposits via pipeline because such deposits are rarely located near a pipeline. Other modes of transfer are therefore needed to make the use of stranded or remote natural gas deposits more economical.

One proposed mode of transportation is an ocean going vessel adapted to contain and store the natural gas in its liquid phase. Natural gas can be liquefied at low temperatures, which is commonly known as liquefied natural gas ("LNG"), or at high pressures, which is commonly known as compressed natural gas ("CNG"). Because LNG and CNG require extreme temperature and/or pressure conditions, extreme care must be exercised when handling natural gas in its liquid phase.

There is a need, therefore, for new systems and methods for transporting liquefied natural gas and/or compressed natural gas.

SUMMARY

Systems and methods for supporting one or more tubular members are provided. In at least one specific embodiment, the system includes a frame and one or more flexible support members, each having a first end and a second end. The first ends and the second ends can be connected to the frame to provide one or more supports for one or more tubular members.

In at least one specific embodiment, the system can include a frame having a first side and a second side, wherein the first side opposes the second side. A plurality of elongated members can be disposed between the first side and the second side. The plurality of elongated members can be arranged and connected to one another to provide a support structure having a plurality of support openings. The support structure can be connected to the first side and the second side.

DETAILED DESCRIPTION

Figure 1:
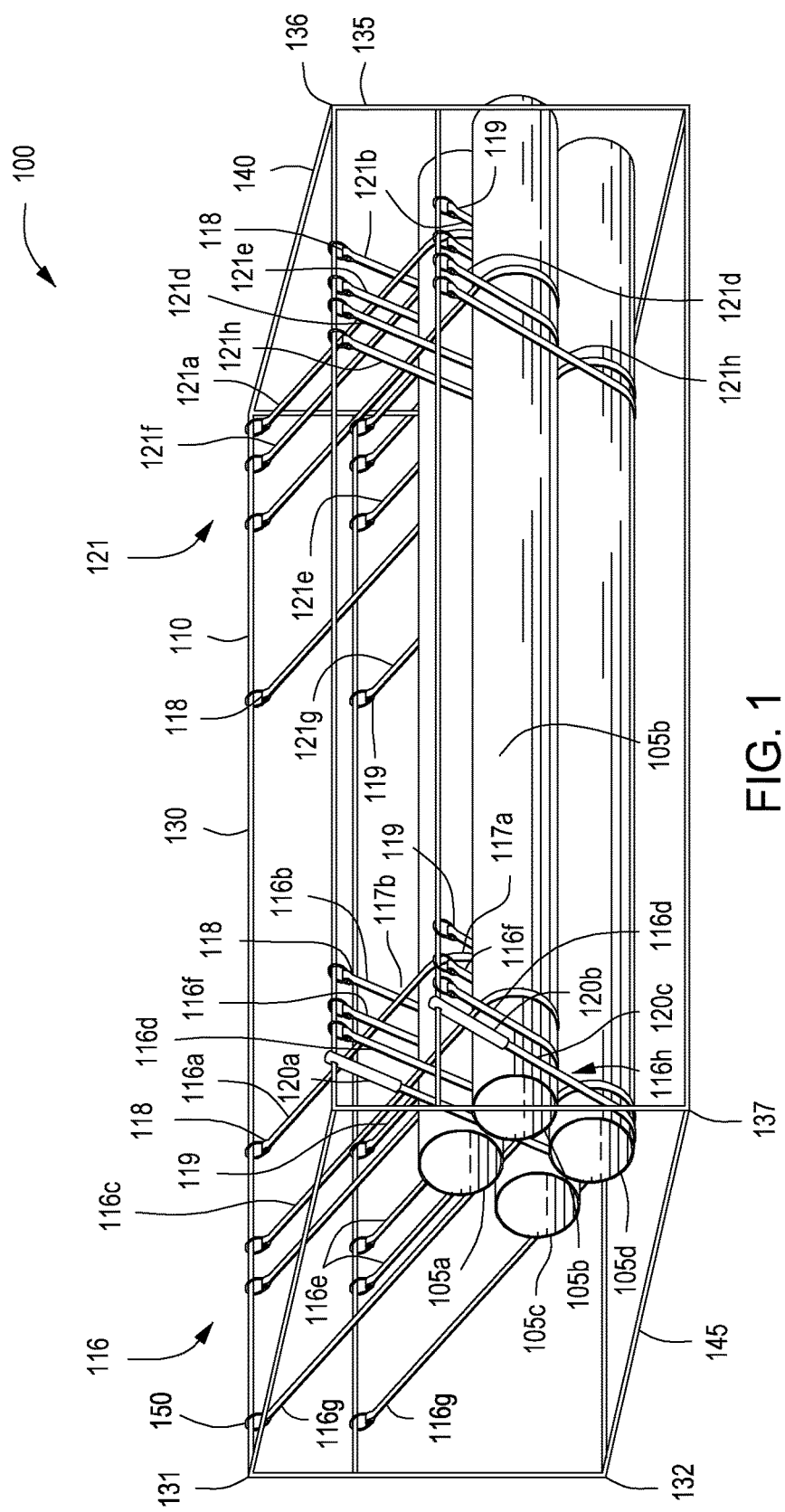
FIG. 1 depicts an isometric view of an illustrative support system for supporting one or more tubular members, according to one or more embodiments described.

FIG. 1 depicts an isometric view of an illustrative support system 100 for supporting one or more tubular members 105, according to one or more embodiments. The support system 100 can include one or more frame structures or frames 110 and one or more support assemblies (two are shown 116, 121). The support assemblies 116, 121 can be secured to the frame structure 110, and used to support one or more tubular members 105. Each support assembly 116, 121 can include one or more individual support members 116a-116h, 121a-121h. As shown, the first support assembly 116 is disposed at a first end of the frame structure 110 and the second support assembly 121 is disposed at a second end of the frame structure 110. The one or more tubular members 105 (four are shown, 105a-105d) are at least partially disposed within the frame structure 110, and held in place by the support assemblies 116, 121. The term "tubular member," as used herein, refers to any elongated member or body. Illustrative tubular members can include, but are not limited to, pipes, pipelines, communication lines, conduits, electrical lines, open channels, ducts, poles, posts, rods, or the like.

The frame structure 110 can have any number of posts, walls, and/or supports. In an embodiment, the frame structure 110 can resemble a box-shaped structure or open sided container having any number of walls or sides, including a first ("left") side 130, a second ("right") side 135, a third ("top") side 140, and a fourth ("bottom") side 145. Each side 130, 135, 140, 145 of the frame structure 110 can be a solid construction such as a solid wall. Each side 130, 135, 140, 145 of the frame structure 110 can also be a solid construction with holes or openings disposed therethrough. Further, each side 130, 135, 140, 145 can be or include one or more cross-beams, braces, poles, or other known construction support member. As used herein, the terms "left" and "right," "top" and "bottom," "front" and "rear," and other like directional terms are merely used for convenience to indicate spatial orientations or spatial relationships relative to one another in respect to the support system 100.

Each support member 116a-116h and 121a-121h can be disposed between and secured to the left side 130 and/or the right side 135 and/or the top side 140 of the frame structure 110. As illustrated a single tubular member 105 is supported by each support member 116a-116h and 121a-121h. However, any number of tubular members 105 can be supported by each support member 116a-116h and 121a-121h. For example, each support member 116a-116h and 121a-121h can support a single tubular member 105 or a plurality of tubular members 105, such as three or five tubular members 105.

In one or more embodiments, the support assemblies 116, 121 can be any elongated member having sufficient flexibility and strength to support the tubular members 105. The support assemblies 116, 121 can be or include any pliable or flexible elongated member. Illustrative support assemblies 116, 121 can include, but are not limited to straps, cables, ropes, chains, wire, string, lines, rods, poles, or the like.

Each support member 116a and 116b can include a first end 118 and a second end 119 that can be secured to the frame structure 110. The support members 116a, 116b can be secured or otherwise attached to the first side 130, the second side 135, and/or the third side 140 of the frame structure 110. The first end 118 and the second end 119 of the support member 116a can be secured to the first side 130 of the frame structure 110 and the first end 118 and the second end 119 of the support member 116b can be secured to the second side 135 of the frame structure 110. As such, the support member 116a can provide a first support cradle or first loop 117a for a tubular member 105a, and the second support member 116b can provide a second support cradle or second loop 117b for the tubular member 105a. A portion of the first loop 117a and the second loop 117b can be aligned such that a portion of the first loop 117a and a portion of the second loop 117b overlap along a longitudinal axis of the tubular member 105a and the tubular member 105a can be supported within the overlapping regions or portions of the first loop 117a and the second loop 117b.

The support members 116a, 116b can be connected or secured to the frame structure 110 using any suitable connector or method of connecting thereto. For example, the ends 118, 119 of the support members 116a, 116b can be tied to the first side. 130 and the second side 135 of the frame structure 110, respectively. In another example, one or more connectors 150 can be used to connect the support members 116a, 116b to the frame. Illustrative connectors 150 can include, but are not limited to, shackles, cinches, master links, interconnected loops, D-rings, rings, turnbuckles, pins, bolts, bolts and nuts, plates, complementary connection devices, such as hooks and loops, welding, adjustable connecting devices, such as a winch or a nut with all-thread or a hydraulic, pneumatic, electric, or any other tensioning device or machine, any other mechanical fastening system, or any combination thereof. Hydraulic, pneumatic, electric, or other self driven or powered adjustable connectors can be controlled via a manifold, computer, or other system that can automatically adjust tension in the support members 116a, 16b. One or more tension monitoring devices, such as strain gauges, can be used to determine or estimate a tension in the support members 116a, 116b. In another example, one or more hooks can be disposed on the ends 118, 119 of the support members 116a, 116b that can be secured to a complimentary receiving loop or ring. In yet another example, one or more loops can be disposed on the ends 118, 119 of the support members 116a, 116b that can be secured to a complimentary receiving hook or pin. In still yet another example, the first ends 118 and/or the second ends 119 of the support members 116a, 116b can be connected to a winch or other device that can be adjusted to increase or decrease tension on the support members 116a, 116b.

The support members 116a and 116b can be longitudinally spaced apart from one another such that the support members 116a and 116b are disposed about a different portion of the first tubular member 105a. In on example, the support members 116a and 116b can be longitudinally spaced apart such that a portion of the sides of the support members 116a and 116b disposed about the first tubular member 105a touch one another. In another example, the support members 116a and 116b can be longitudinally spaced apart such that a gap or distance is provided between a portion of the sides of the support members 116a and 116b disposed about the first tubular member 105a. The spacing or distance between any two adjacent or sequential support members, for example 116a and 116b, can be the same or different with respect to one another. In one or more embodiments, the spacing or distance between any two adjacent or serially located sets of support assemblies 116, 121 can vary periodically, follow a set pattern or periods, increase, decrease, or any combination thereof.

The other support members 116c-116h and 121a-121h can be similar to the first support member 116a or the second support member 116b. Furthermore, the spacing provided between any two adjacent or sequential support members 116a-116h and 121a-121h can be the same or different with respect to one another. For example, the spacing between support members 116a and 116b can be the same or different than the spacing between support members 116c and 116d. The support members 116a-116h, 121a-121h can also be disposed about the tubular members 105 at the same position or location along the tubular members 105. The support members 116a-116h, 121a-121h can also be disposed about the tubular members 105 such that the support members partially overlap the same position or location along the tubular members 105.

In one or more embodiments, the first end 118 of the support member 116a can be disposed closer to a first ("upper") end 131 of the first side 130 and the second end 119 of the support member 116a can be disposed closer to a second ("lower") end 132 of the first side 130. The first end 118 and the second end 119 of the support member 116a can be secured to the first side 130 a distance apart from one another that can be equal to or about equal to a diameter of the first tubular member 105a supported in the first loop 117a. Similarly, the first end 118 of support member 116b can be disposed closer to a first ("upper") end 136 of the second side 135 and the second end 119 of the support member 116b can be disposed closer to a second ("lower") end 137 of the second side 135. The first end 118 and the second end 119 of the support member 116b can be secured to the second side 135 a distance apart from one another that can be equal to or about equal to the diameter of the tubular member 105 supported in the second loop 116b.

The support members 116a, 116b can be oriented at any suitable angle with respect to the first side 130 and the second side 135 of the frame structure 110. For example, the support member 116a can be oriented at an angle ranging from about 10° to about 170° with respect to the first side 130 of the frame structure 110, where the angle is located between the attachment point of the first end 118 and/or the second end 119 of the support member 116a and the first side 130. In another example, the support member 116a can be oriented at an angle of about 45° with respect to the first side 130, where the 45° angle is located between the attachment point of the first end 118 and/or the second end 119 of the support member 116a to the first side 130 and the second end 132 of the first side 130. Although not shown, depending on the number of tubular members 105 supported by the support system 100, some support members 116 can be connected to the third side 140 of the frame structure 110.

As discussed above, the remaining support members 116c-116h and 121a-121h can be secured to the frame structure 110 and disposed about the other tubular members 105b-105c to provide tubular member support cradles or support loops 117c-117h and 122a-122h similar to the support loops 117a and 117b. For example, support members 116c and 116d can support the tubular member 105b, support members 116e and 116f can support the tubular member 105c, and support members 116g and 116h can support the tubular member 105d, as depicted in FIG. 1. The second set of support members 121 can be secured to the frame structure 110 in a similar manner as the first set of support members 116, which can support the tubular members 105 at a second location along the longitudinal length of the tubular members 105a-105d.

Although the frame structure 110, as shown in FIG. 1, has four sides 130, 135, 140, 145 that provide a rectangular opening within which the tubular members 105 are disposed, the frame structure 110 can have any number of sides to provide any shaped opening or cross-section. For example, the frame structure 110 can provide an opening or cross-section that is circular, triangular, rectangular, pentagonal, hexagonal, or any other polygonal or elliptical configuration.

In one or more embodiments, the frame structure 110 can be disposed on the deck of a ship, the floor of a cargo hold of a ship, a truck bed, a train car bed, or other mode of transportation. For example, the frame structure 110 can be disposed on a vehicle, a platform, or the like to provide a mobile support system or the frame structure 110 can be secured to the ground to provide a stationary or fixed support system. Any side or portion of the vehicle can be used to form part of the frame structure 110. For example, the inner or interior walls of a cargo hold within a transport ship can serve as any one or more of the sides 130, 135, 140, 145 of the frame structure 110.

The frame structure 110 can be made of any suitable material. Suitable materials include, but are not limited to, a metal, metal alloy, non-metallic materials, or combinations thereof. Illustrative metals and metal alloys can include, but are not limited to, steel, carbon steel, steel alloys, stainless steel, stainless steel alloys, aluminum, aluminum alloys, nickel, nickel based alloys, bronze, brass, non-ferrous metals, non-ferrous metal alloys, or combinations thereof. Illustrative non-metallic materials can include, but are not limited to, carbon fiber, epoxies, fiberglass, polypropylene, polyethylene, ethylene propylene diene monomer ("EPDM"), polyurethane, blends thereof, or other polymeric materials with suitable mechanical properties.

Still referring to FIG. 1, the support system 100 can be used to support any number of tubular members 105 having any length. For example, the support system 100 can be used to support 10 or more, 20 or more, 50 or more, 100 or more, 200 or more, 300 or more, 400 or more, or 500 or more, or 1,000 or more tubular members 105. Each tubular member 105 can have a length ranging from a low of about 0.3 m, about 1 m, about 1.5 m, about 3 m, 6 m, or about 12 m to a high of about 20 m, about 40 m, about 80 m, about 121 m, about 160 m, or about 200 m. The tubular members 104 can have any suitable outer diameter (OD). For example, the outer diameter of the one or more tubular members 105 can range from a low of about 2 cm, about 4 cm, about 10 cm, about 20 cm, about 30 cm, about 40 cm, or about 50 cm to a high of about 121 cm, about 140 cm, about 160 cm, about 180 cm, or about 200 cm.

In one or more embodiments, two or more tubular members 105 can be sequentially connected together to form a continuous pipeline (not shown). The tubular members 105 can be connected using 180° bends, 90° elbows, or the like to form a serpentine pipeline. In one or more embodiments, the individual tubular members 105 and/or a pipeline formed from a plurality of tubular members 105 can carry one or more materials disposed therein. For example, the tubular members 105 and/or pipeline formed therefrom can carry LNG or CNG.

The one or more tubular members 105 can be one or more ferrous or non-ferrous pipe sections. The one or more tubular members 105 can be one or more polymeric pipe sections. The one or more tubular members 105 can be fabricated using one or more materials suitable for use in high pressure service, for example at a pressure of about 3.5 MPa or more, about 7 MPa, or more, about 14 MPa or more, about 20 MPa or more, or about 27 MPa or more. The one or more tubular members 105 can be fabricated using one or more materials suitable for use in low and/or high temperature service, for example at a temperature of about 300° C. or less, about 150° C. or less, about 100° or less, about 50° C. or less, about 0° C. or less, about −50° C. or less, about −75° C. or less, about −100° C. or less, about −130° C. or less, or about −150° C. or less. In one or more specific embodiments, the one or more tubular members 105 can be made from one or more materials suitable for use in cryogenic or near-cryogenic service, at temperatures of less than about −100° C. and at pressures greater than about 10 MPa.

Considering the support assemblies 116, 121 in more detail, each support member 116a-116h, 121a-121h can be the same or different, and made from metals, metal alloys, non-metallic material, synthetic materials, non-synthetic materials, derivatives thereof, and combinations thereof. Illustrative materials can include, but are not limited to, polyester, nylon, polyethylene, polypropylene, para-aramid synthetic fiber (e.g., KEVLAR®), high-performance polyethylene ("HPPE"), organic fibers, metals, metal alloys, and any combinations thereof. In a specific embodiment, at least one support assemblies 116, 121 can be a metal cable that is optionally coated with one or more non-metallic materials. Other illustrative materials can include, but are not limited to, carbon fiber, epoxies, fiberglass, ethylene propylene diene monomer ("EPDM"), polyurethane, blends thereof, or other polymeric materials with suitable mechanical properties.

The support members 116a-116h, 121a-121h can have any cross-sectional shape and size. Illustrative cross-sectional shapes can include, but are not limited to, circular (e.g., a rope or cable), and rectangles (e.g., a strap). The diameter or cross-sectional length of the support members 116a-116h, 121a-121h can range from a low of about 0.25 cm, about 0.5 cm, or about 1 cm to a high of about 2 cm, about 5 cm, about 10 cm, or more than about 10 cm. For example, the width of a rectangular support member 116a, e.g., a strap, can range from a low of about 1 cm, about 2 cm, about 3 cm, or about 4 cm to a high of about 8 cm, about 15 cm, 20 cm, about 25 cm, about 50 cm, or more than about 50 cm. The thickness of a rectangular support member 116a, e.g., a strap, can range from a low of about 0.1 cm, about 0.15 cm, or about 1 cm, to a high of about 5 cm, about 10 cm, about 15 cm, or more than about 15 cm. The length of the support members 116a-116h, 121a-121h can be based, at least in part, on the number of tubular members 105 that are to be supported within the support system 100, the number of tubular members 105 that are to be supported by each support member 116a-116h, 121a-121h, or a combination thereof. As such, the length of the support members 116*a*-116*h*, 121*a*-121*h* can range from about 50 cm to about 200 m, or from about 25 m to about 500 m, or from about 10 m to about 100 m, for example.

Although not shown, the support members 116*a*-116*h*, 121*a*-121*h* can be an elongated member that includes two or more independent sections or lengths connected to one another. In one or more embodiments, the support members 116*a*-116*h*, 121*a*-121*h* can include a first section (for example, a first metal cable) connected to a first end of a second section (for example, a strap) and a third section (for example, a second metal cable) connected to a second end of the second section, thereby providing support members 116*a*-116*h*, 121*a*-121*h* that include three independent sections or lengths connected together. The second section of support members 116*a*-116*h*, 121*a*-121*h* having three sections can be disposed between the first and third sections, such that the second section contacts and supports a tubular member 105 with the first and third sections remaining out of contact with the tubular members 105. As such, the second section of support members 116*a*-116*h*, 121*a*-121*h* having three sections can be replaced should the second section in contact with a tubular members 105 require replacement, but the first and third sections of the support members 116*a*-116*h*, 121*a*-121*h* can remain in use. Similarly, the first and/or the third sections of support members 116*a*-116*h*, 121*a*-121*h* having three sections can be replaced should either or both of the first and third sections require replacement. Also, it can be beneficial for the first section, the second section, and/or the third section of the support members 116*a*-116*h*, 121*a*-121*h* to be or include a conducting or non-conducting material. Similarly, for a support member 116*a*-116*h*, 121*a*-121*h* that includes one section, two sections, or more than three sections, any one or more of those sections can be or include a conducting or non-conduction material.

Any one or more support members 116*a*-116*h*, 121*a*-121*h* can include a first metal pole or rod connected to a first end of a strap and a second metal pole or rod connected to a second end of the strap, thereby providing a support member that has three independent sections. The strap can be located between the metal poles or rods, such that the strap contacts and supports a tubular member 105 so that the metal poles or rods do not contact the tubular member 105. The metal poles or rods can be rigidly secured to the frame structure 110, for example by welding thereto. Alternatively, the metal poles or rods can be pivotably, rotatably, or otherwise moveably secured to the frame structure 110 to provide movement of the support members with respect to the frame structure 110. Support member 116*h* can include a first metal rod 120*a* connected to a first end of a flexible member 120*c* and a second metal rod 120*b* connected to a second end of the flexible member 120*c*, as depicted in FIG. 1. The first metal rod 120*a* and the second metal rod 120*b* can also be secured to the frame structure 110.

Although not shown, each support assembly 116, 121 can include a single, continuous support member that interweaves between the tubular members 105 and secures to the frame structure 110 at multiple locations. Likewise, each support assembly 116, 121 can include two or more support members that interweave between the tubular members 105 and secures itself to the frame structure 110 at multiple locations. Although not shown, any support member 116*a*-116*h*, 121*a*-121*h* can be secured to one or more sides of the frame structure 110. For example, the first end 118 of any support member 116*a*-116*h*, 121*a*-121*h* can be connected to the left side 130 of the frame structure 110 and toward a first end thereof, and the second end 119 of the same support member can be connected to the right side 135 and toward a second end of the frame structure 110.

Figure 2:
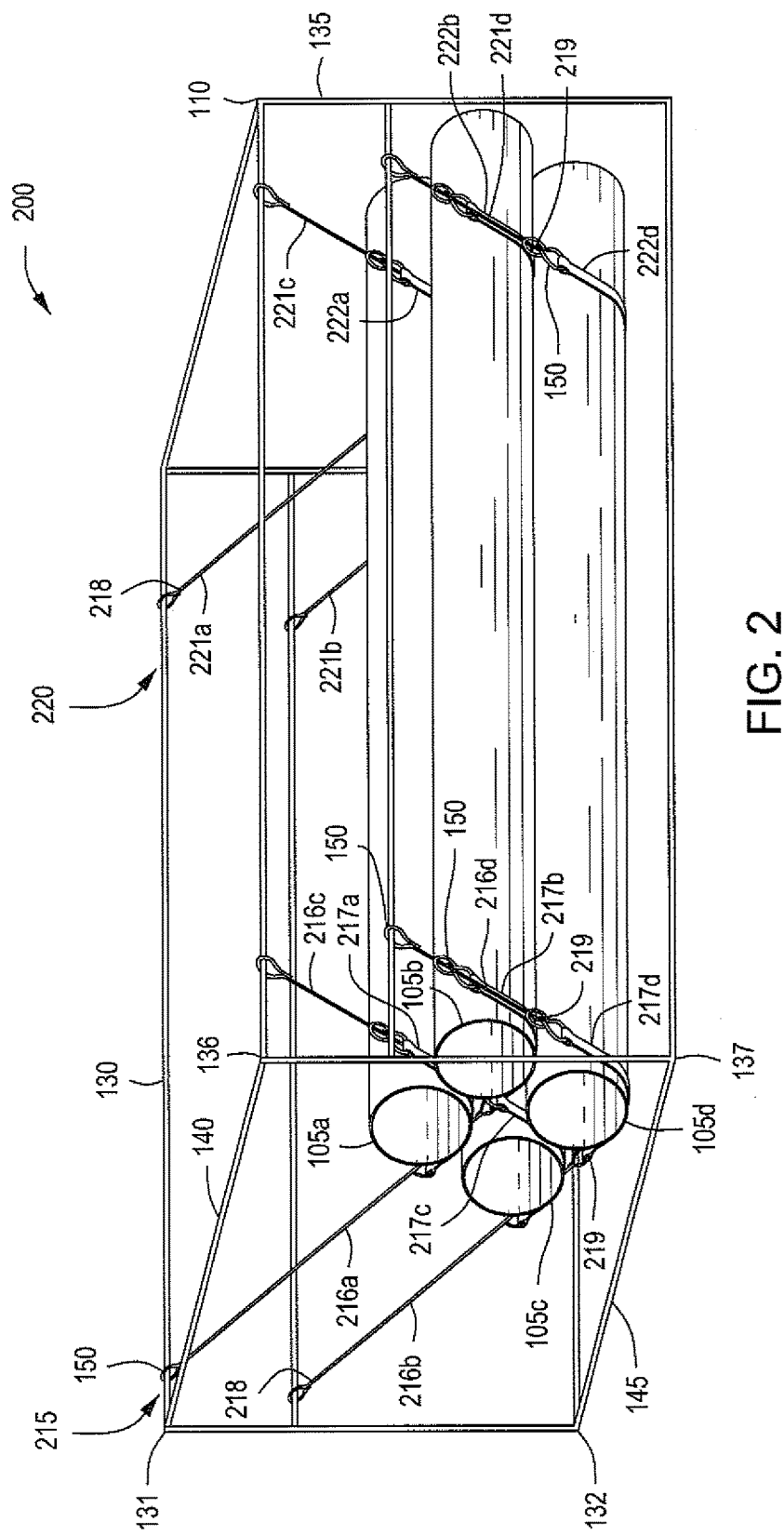
FIG. 2 depicts an isometric view of another illustrative support system for supporting one or more tubular members, according to one or more embodiments described.

FIG. 2 depicts an isometric view of another illustrative support system 200 for supporting one or more tubular members 105, according to one or more embodiments. The support system 200 can include one or more frame structures or frames 110 and one or more support assemblies (two are shown 215, 220). The support assemblies can be secured to the frame structure 110, and used to support one or more tubular members (four are shown, 105*a*-105*b*). The frame structure 110 and the tubular members 105*a*-105*d* have been discussed and described above with reference to FIG. 1. The support assemblies 215, 220 can include a plurality of first support members 216, 221 and a plurality of second support members 217, 222, respectively, that can be interconnected with one another and secured to the frame structure 110.

The first support members 216, 221 and the second support members 217, 222 can include any suitable support member. The first support members 216, 221 and the second support members 217, 222 can be similar to the support members 116*a*-116*h*, 121*a*-121*h* discussed and described above with reference to FIG. 1. The first support members 216, 221 and the second support members 217, 222 can be the same or different type of elongated member and can be made from the same or different type of material(s). In at least one embodiment, the first support members 216, 221 can be cables or chains and the second support members 217, 222 can be ropes or straps. In at least one other example, the first support members 216, 221 and the second support members 217, 222 can all be straps, cables, ropes, or the like.

Each set of support assemblies 215, 220 can include two or more first support members 216, 221, respectively, that can be connected together via one or more second support members 217, 222, respectively. As illustrated each set of support assemblies 215, 220 includes four first support members 216*a*-216*d* and 221*a*-221*d*, respectively and four second support members 217*a*-217*d* and 222*a*-222*d*, respectively.

Each first support member 216*a*-216*d* can include a first end 218 and a second end 219. In one or more embodiments, the first ends 218 of the first support members 216*a*, 216*b* can be secured to the first side 130 of the frame structure 110 and the first ends 218 of the first support members 216*c*, 216*d* can be secured to the second side 135 of the frame structure 110. The second ends 219 of the support members 216*a*-216*d* can be located between the first side 130 and the second side 135 of the frame structure 110 and secured to one of the second support members 217*a*-217*d*. Although not shown, the second ends 219 of the first support members 216*a*-216*d* can be secured to the fourth side 145 of the frame structure 110, the ground, or other surface the frame structure 110 is disposed on. In another example, the second ends of the first support members 216*a*, 216*b* can be secured to the second side 135 of the frame structure 110 and the second ends 219 of the first support members 216*c*, 216*d* can be secured to the first side 130 of the frame structure 110.

The second support member 217*a* can be secured to the first support members 216*a*, 216*c* between the first ends 218 and the second ends 219 thereof. A first tubular member 105*a* can be supported by the first support member 217*a*. The second support member 217*b* can be secured to the second end 219 of the first support member 216*a* and to the first support member 216*d* between the first end 218 and the second end 219 thereof. A second tubular member 105*b* can be supported by the second support member 217*b*. The second support member 217c can be secured to the second end 219 of the first support member 216c and to the first support member 216b between the first end 218 and the second end 219 thereof. A third tubular member 105c can be supported by the third support strap 217c. The second support member 217d can be secured to the second ends 219 of the first support members 216b, 216d. A fourth tubular member 105d can be supported by the fourth support strap 217d. As such, the first support assembly 215 can be disposed about and support a first end of the tubular members 105a-105d and the second support assembly 220 can be disposed about and support a second end of the tubular members 105a-105d. As illustrated a single tubular member 105a, 105b, 105c, 105d is supported by each second support member 217a, 217b, 217c, 217d, respectively. However, any number of tubular members 105 can be supported by each second support member 217a, 217b, 217c, 217d. For example, each second support member 217a, 217b, 217c, 217d can support a single tubular member 105 or a plurality of tubular members 105.

Any number of support assemblies 215, 220 can be disposed about or along the length of one or more tubular members 105. As illustrated two support assemblies 215, 220 support four tubular members 105a-105d and are located toward a first end and a second end of the tubular members 105a-105d, respectively. However, additional support assemblies can be disposed intermediate the support assemblies 215, 220. The spacing or distance between any two adjacent or sequential support assemblies can be the same or different with respect to one another. In one or more embodiments, the spacing or distance between any two adjacent or serially located support assemblies can vary periodically, follow a set pattern or period, increase, decrease, or any combination thereof.

The first support members 216a-216d can be oriented at any suitable angle with respect to the first side 130 and the second side 135 of the frame structure 110. The first support members 216a, 216b that are secured to the first side 130 of the frame structure 110 can be oriented at an angle ranging from about 10° to about 170°, where the angle is located between the attachment point of the support cables 216a, 216b and the first side 130 of the frame structure 110. For example, the first support members 216a, 216b can be oriented at an angle of about 45° with respect to the first side 130, where the 45° angle is located between the attachment point of the first support members 216a, 216b to the first side 130 and the second end 132 of the first side 130. Similarly, the first support members 216c, 216d that are secured to the second side 135 of the frame structure 110 can be oriented at an angle ranging from about 10° to about 170°, where the angle is located between the attachment point of the first support members 216c, 216d and the second side 135 of the frame structure 110. For example, the first support members 216c, 216d can be oriented at an angle of about 45° with respect to the second side 135, where the 45° angle is located between the attachment point of the first support members 216c, 216d to the second side 135 and the second end 137 of the second side 135. Although not shown, any one or more of the first support members 216a-216d can be connected to the third side 140 of the frame structure 110.

In at least one specific embodiment, the first support members 216a-216d, 221a-221d can be rigid, elongated members, such as a pipe, rod, beam, or the like that can be secured to the frame structure 110 and the second support members 217a-217d, 222a-222d can be a pliable or flexible elongated member such as a rope, cable, wire, strap, or the like. A flexible second support member 217a-217d, 222a-222d can conform to the outer profile of the tubular members 105. In at least one other specific embodiment, the second support members 217a-217d, 222a-222d can be a rigid structure or body having a curved surface in which the tubular members 105 can be supported. The curved surface of a second support member 217a-217d, 222a-222d having a rigid structure can conform to the outer profile of the tubular members 105.

The support straps 217, 222 can be secured or connected to the first support members 216a-216d, 221a-221d using any suitable connector or fastening device 150. The connector 150 has been discussed and described above with reference to FIG. 1. In at least one example, the second support members 217a-217d, 222a-222d can be a portion of the first support members 216a-216d, 221a-221d. For example, the first support member 216a can include multiple strands of wire that can be split or separated and a portion of the wire strands can be used to provide the second support strap 217a that can support the tubular member 105a.

The first ends 218 of first support members 216a-216d, 221a-221d can be secured to the frame structure 110 using any suitable connector or fastening device 150. For example, the first ends 218 of the first support members 216a-216d can include an eyelet that can be connected to a hook disposed on the frame structure 110. In another example, the first ends 218 of the first support members 216a-216d can be connected via an adjustable connector or adjustable fastener. For example, the first ends 218 of the first support members 216a-216d can be connected to a winch or turnbuckle or nut with all-thread that can be adjusted to increase or decrease the tension of the first support members 216a-216d and/or the second support members 217a-217d. In another example, the first ends 218 or any portion of the first support members 216a-216d an be connected to a hydraulic, pneumatic, electric, or any other suitable tensioning device that can increase or decrease the tension of the first support members 216a-216d and/or the second support members 217a-217d.

Figure 3:
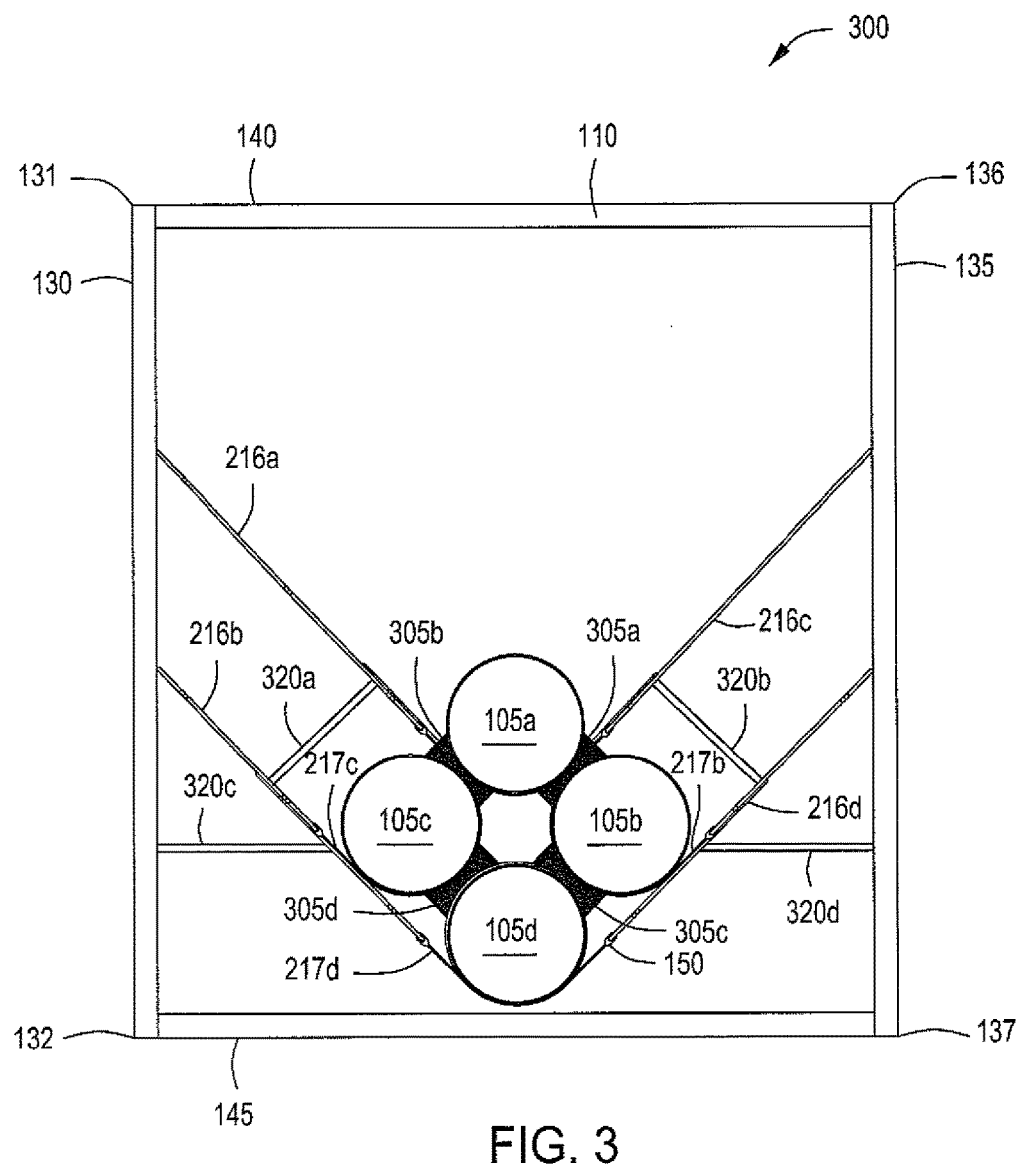
FIG. 3 depicts an end view of another illustrative support system for supporting one or more tubular members that includes stabilization members, according to one or more embodiments described.

FIG. 3 depicts an end view of yet another illustrative support system 300 for supporting one or more tubular members 105 that further includes stabilization members 305, 320, according to one or more embodiments. As illustrated, FIG. 3 depicts an end view of the support system 200 discussed and described above with reference to FIG. 2, but further includes tubular member stabilizers (four are shown, 305a-305d) and support member stabilizers (four are shown, 320a-320d). The stabilizers 305, 320 can prevent or reduce movement of the tubular members 105 supported by the support system 200. For example, the stabilizers 305 and/or 320 can reduce sway or movement of the pipes 105 toward the left side 130 and/or the right side 135 of the frame structure 110. The stabilizers 305, 320 can control spacing between the tubular members 105. For example, the stabilizers 305 can maintain a predetermined distance between two adjacent tubular members 105. The stabilizers 320 can control spacing between the first support members 216a-216d, 221a-221d. For example, the stabilizers 320 can control the spacing between the first support member 216d and the left side 130 of the frame structure 110. In another example, the stabilizer 320 can control the spacing between the first support member 216a and the first support member 216b.

The stabilizers 305a-305d can be disposed between two adjacent tubular members 105. For example, the stabilizer 305a can be disposed between tubular members 105a and 105b, the stabilizer 305b can be disposed between the tubular members 105a and 105c, the stabilizer 305c can be disposed between the tubular members 105b and 105d, and the stabilizer 305d can be disposed between the tubular members 105e and 105d. The stabilizer 305 can be a rigid and/or compliant body that can conform to the outer surface of the tubular members 105. For example, the stabilizer 305 can be a rigid body having two curved surfaces that compliment the outer surface of the tubular members 105. In one example, the stabilizers 305 can be disposed between any two adjacent tubular members 105 and secured therebetween via friction. In another example, the stabilizers 305 can be disposed between any two adjacent tubular members 105 and secured in place using one or more fasteners, e.g., bolts and nuts, screws, rivets, or pins; adhesives; welding; or the like. Although not shown, in one or more embodiments, the stabilizer 305 can be disposed between three or more tubular members 105.

As illustrated, one stabilizer 305 is shown disposed between each tubular member 105; however, any number of stabilizers 305 can be disposed between any number of tubular members 105. For example, one stabilizer 305 can be disposed between any two tubular members with no stabilizers 305 disposed between any of the remaining tubular members. In another example, two or more stabilizers 305 can be disposed between and along the length of any two adjacent tubular members 105.

The one or more stabilizers 320 can be disposed between any two adjacent first support members 216a-216d, 221a-221d. For example, the stabilizer 320a can be disposed between the support members 216a and 216b and the stabilizer 320b can be disposed between the support members 216c and 216d. As shown, the stabilizers 320a, 320b can be disposed perpendicularly to the support members 216a-216d. In at least one example, the stabilizers 320a, 320b can be disposed between any two first support members 216a-216d in a non-perpendicular orientation. Although not shown, in at least one specific example, the stabilizers 320a, 320b can be "multi-arm" stabilizers that can connect to three or more first support members 216a-216d. Although not shown, in at least one other example, the stabilizers 320a, 320b can be disposed between one or more first support members 216a-216d and one or more second support members 217a-217b. Although not shown, in still another example, one or more stabilizers 320 can be disposed between the two support assemblies 215, 221 (see FIG. 2).

The stabilizer 320 can be disposed between any first support member 216a-216d and the frame structure 110. For example the stabilizer 320c can be disposed between the first support member 216b and the first side 130 of the frame structure 110 and the stabilizer 320d can be disposed between the first support member 216d and the second side 135 of the frame structure 110. Any number of stabilizers 320 can be disposed about the support system 200. Although not shown, in at least one specific example, the stabilizers 320c, 320d can be "multi-arm" stabilizers that can connect to two or more first support members 216a-216d and the frame structure 110.

The length of the stabilizers 320 can be adjustable. Illustrative adjustable stabilizers 320 can include, but are not limited to cable tensioners, springs, shocks, hydraulic members, pneumatic members, electric members, or the like. The stabilizers 320 can be rigid, i.e. non-adjustable along the length of the stabilizer 320. Illustrative rigid stabilizers 320 can include, but are not limited to, rods, beams, poles, bars, or the like.

The stabilizers 320 can be secured to the first support members 216a-216d, 221a-221d and/or to the frame structure 110 using any suitable fastener. For example, the stabilizers 320 can be secured using bolts and nuts, screws, rivets, pins, welding, or the like. In at least one other example, the stabilizers 320 can include hooks or loops disposed on the ends thereof that can be secured to a complimentary hook or loop disposed on the support cables 216 or the frame structure 110.

Figure 4:
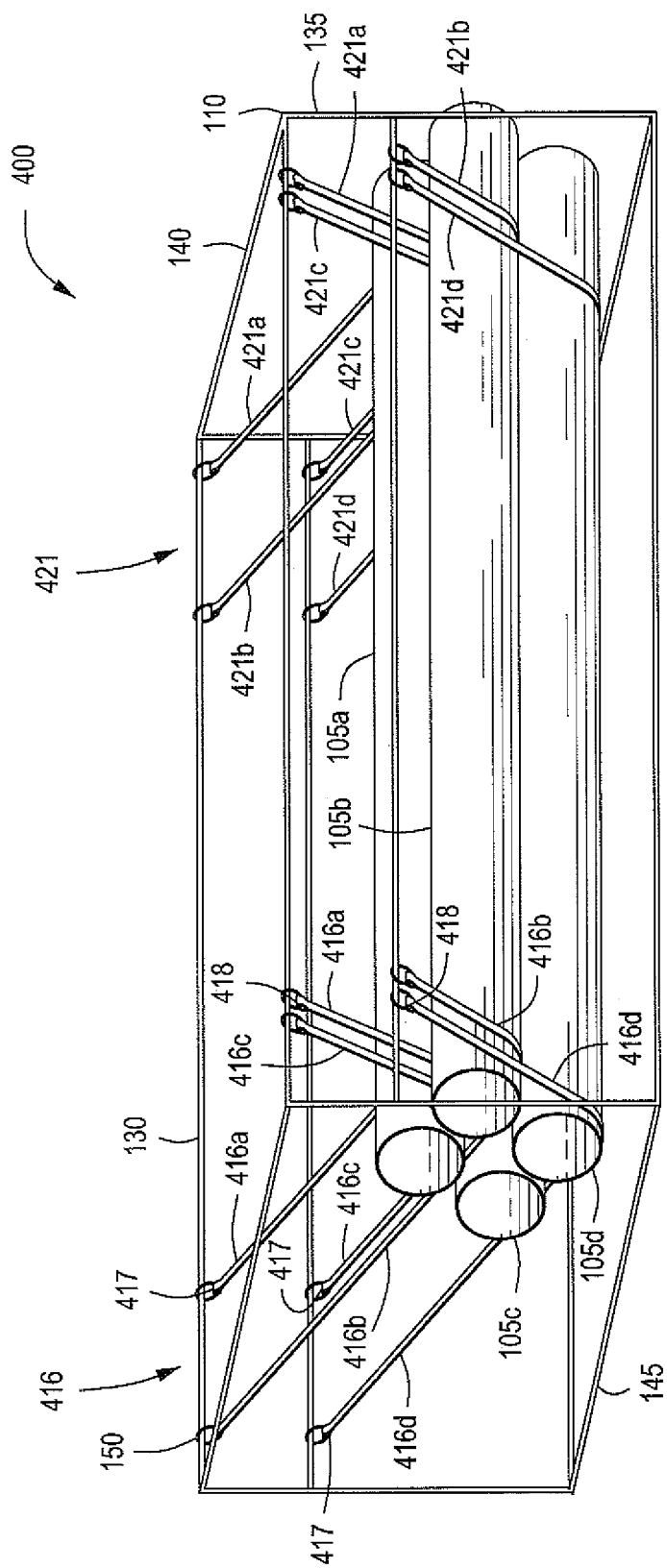
FIG. 4 depicts an isometric view of still another illustrative support system for supporting one or more tubular members, according to one or more embodiments described.

FIG. 4 depicts an isometric view of yet another illustrative support system 400 for supporting one or more tubular members 105, according to one or more embodiments. The support system 400 can include one or more frame structures 110 and one or more support assemblies (two are shown 416, 421). The support assemblies 416, 421 can be secured to the frame structure 110, and used to support one or more tubular members (four are shown 105a-105d). Each support assembly 416, 421 can include one or more individual support members (four are shown, 416a-416d and 421a-421d, respectively). The tubular members 105a-105d and the frame structure 110 have been discussed and described above with reference to FIGS. 1-3. The support members 416a-416d, 421a-421d can be similar to the support assemblies 116, 121, 217, 222, 216, 221 discussed and described above with reference to FIGS. 1-3. As illustrated in FIG. 4, a single tubular member 105 is supported by each support member 416a-416d and 421a-421d. However, any number of tubular members 105 can be supported by each support member 416a-416d and 421a-421d. For example, each support member 416a-416d and 421a-421d support a single tubular member 105 or a plurality of tubular members 105, such as three or five tubular members 105.

Each support member 416a-416d has a first end 417 and a second end 418. The first ends 417 and the second ends 418 of the support members 416a-416d can be secured to the first side 130, the second side 135, the third side 140, or the fourth side 145 of the frame structure 110. The first ends 417 and the second ends 418 can be secured to the same side or a different side. For example, as illustrated in FIG. 4, the first ends 417 of the support members 416a-416d are secured to the first side 130 of the frame structure 110 and the second ends 418 of the support members 416a-416d are secured to the second side 135 of the frame structure 110. In another example, the first ends 417 can be secured to the first side 130 and the second ends 418 can be secured to the third side 140. In yet another example, the first ends 417 can be secured to the third side 140 and the second ends 418 can be secured to the second side 135. In still another example, both the first ends 417 and the second ends 418 can be secured to the third side 140. In one or more embodiments, the first ends 417 and the second ends 418 of the support members 416a-416d can be secured to different sides of the frame structure 110, for example the first side 130 and the second side 135, and longitudinally disposed about the same location or different locations along the tubular members 105a-105d. For example, the first end 417 of support member 416a can be secured to the first side 130 near a first end of the tubular member 105 and the second end 418 of support member 416a can be secured to the second side 135 near a second end of the tubular member 105a.

In one or more embodiments, one or more stabilization members 305, 320 (see FIG. 3) can be disposed about the support system 400, as discussed and described above with reference to FIG. 3. The support members 416, 421 can be connected or secured to the frame structure 110 using a connector 150, which can be as discussed and described above with reference to FIG. 1.

Figure 5:
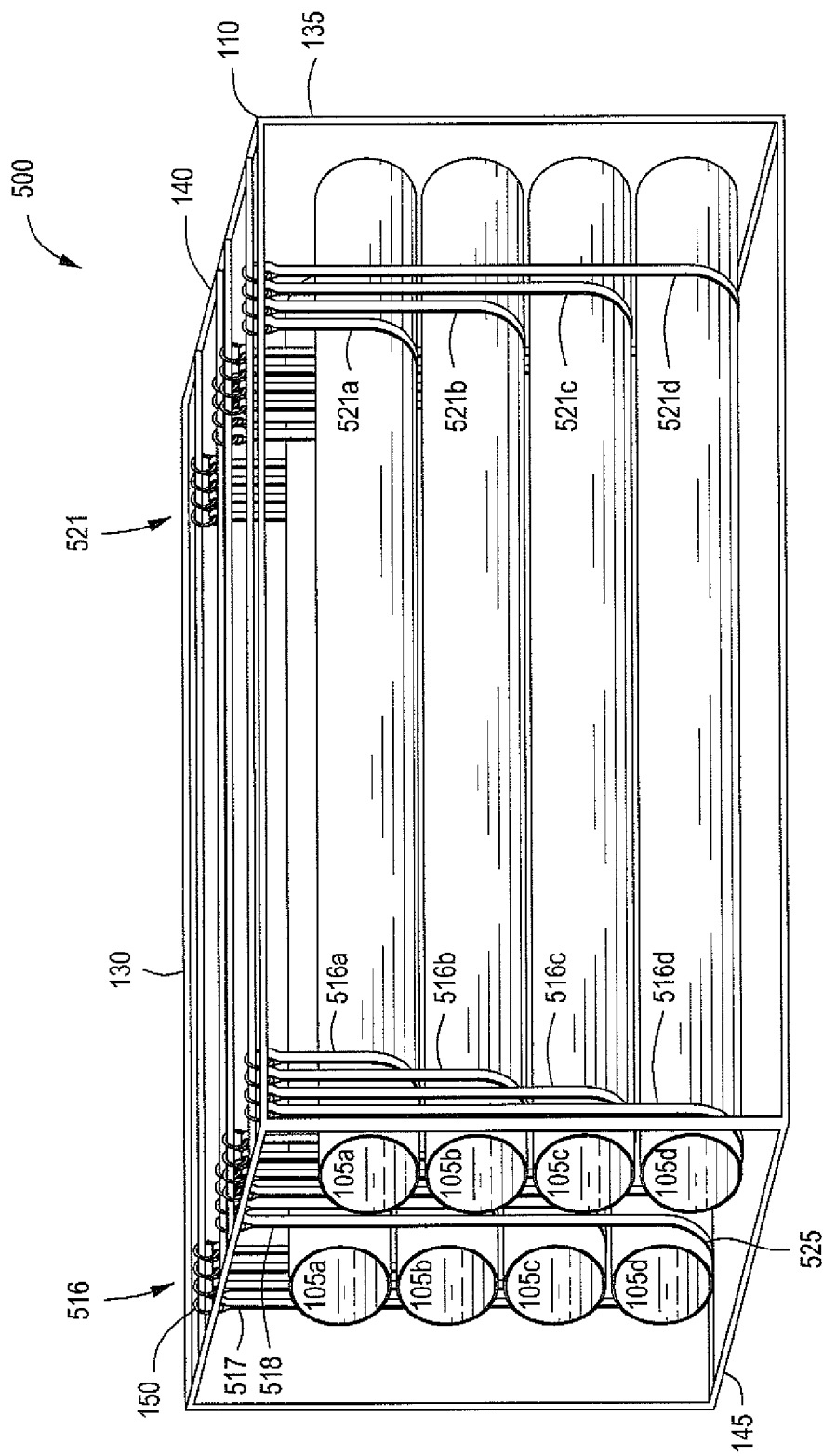
FIG. 5 depicts an isometric view of still yet another illustrative support system for supporting vertical rows of tubular members, according to one more embodiments described.

FIG. 5 depicts an isometric view of still another illustrative support system 500 for supporting a one or more vertical rows of one or more tubular members 105, according to one more embodiments. The support system 500 can include a frame structure 110 and one or more sets of support assemblies (two are shown 516, 521). The support assemblies 516, 521 can be secured to the frame structure 110, and used to support one or more tubular members (four are shown, 105a-105d). The tubular members 105a-105d and the frame structure 110 have been discussed and described above with reference to FIGS. 1-4. Each support assembly 516, 521 can include one or more support members (two sets of four are shown, 516a-516d and 521a-521d, respectively). As shown in FIG. 5, the support assembly 516 is disposed at a first end of the frame structure 110 and the support assembly 521 is disposed at a second end of the frame structure 110. The support members 516a-516d, 521a-521d can be similar to the support members (e.g., the support members 116a-116h) discussed and described above with reference to FIGS. 1-4. The support members 516a-516d, 521a-512d can have varying lengths with respect to one another. The support members 516a-516d, 521a-521d can be connected or secured to the frame structure 110 using one or more connectors 150, which have been discussed and described above with reference to FIG. 1-4.

The support members 516a-516d can have a first end 517 and a second end 518. The first ends 517 and the second ends 518 of the support members 516a-516d can be secured to the third side 140 of the frame structure 110 to provide a plurality of tubular member support cradles or support loops 525 that can support row of tubular members 105. As illustrated in FIG. 5, two vertical rows of tubular members 105a-105d are supported by the support members 516a-516d, with the support members 516a-516d each having a different length with respect to one another. For example, the support members 516a have a first length, the support members 516b have a second length, the support members 516c have a third length, and the support members 516d have a fourth length. The second length can be longer than the first length, the third length can be longer than the second length, and the fourth length can be longer than the third length. As such, the support members 516a-516d can be secured to the third side 140 of the frame structure 110 and can support a row of vertically aligned tubular members 105a-105d.

The support members 516a-516d that support each row of vertically aligned tubular members 105a-105d can be secured about the third side 140 of the frame structure 110 at the same location/position or at different locations/positions on the third side of the frame structure 110. In at least one specific example, the support members 516a-516d can be secured to the third side 140 of the frame structure 110 at a single, localized connection point and the support members 516a-516d can be disposed about each tubular member 105a-105d at the same or substantially the same location or position along the longitudinal axis of the tubular members 105a-105d. In other words, the support members 516a-516d supporting the tubular members 105a-105d can overlap or at least partially overlap one another. In at least one other specific example, the support members 516a-516d can be secured to the third side 140 of the frame structure 110 at longitudinally spaced locations or positions between the first end and the second end of the frame structure 110. As such, each support member 516a-516d can be disposed about the tubular members 105a-105d at different locations or positions along the longitudinal axis of the tubular members 105a-105d. In other words, the support members 516a-516d can support the tubular members 105a-105d in a non-overlapping configuration or arrangement with respect to the support members 516a-516d.

Any number of support members 516a, 516b, 516c, 516d can be disposed about the tubular members 105a, 105b, 105c, 105d, respectively. As shown, one support member 516a, 516b, 516c, 516d can be disposed about each tubular member 105a, 105b, 105c, 105d, respectively. In at least one example, a plurality of support members 516a, 516b, 516c, 516d can be disposed about each tubular member 105a, 105b, 105c, 105d, respectively. The number of support members 516a, 516b, 516c, 516d in the support assembly 516 can be the same or different.

Any number of support assemblies 516, 521 can be disposed about the length of the tubular members 105a-105d. As shown, two support assemblies 516, 521 can be disposed along the longitudinal axis of the tubular members 105a-105d, with one support assembly 516 disposed at the first end of the frame structure 110 and one support assembly 521 disposed at the second end of the frame structure 110. However, any number of support assemblies 516, 521 can be used to support any number of tubular members 105. The spacing between adjacent support assemblies 516, 521 can vary with respect to one another.

In one or more embodiments, one or more stabilization members 305, 320 (see FIG. 3) can be disposed about the support system 500, as discussed and described above with reference to FIG. 3.

Figure 6:
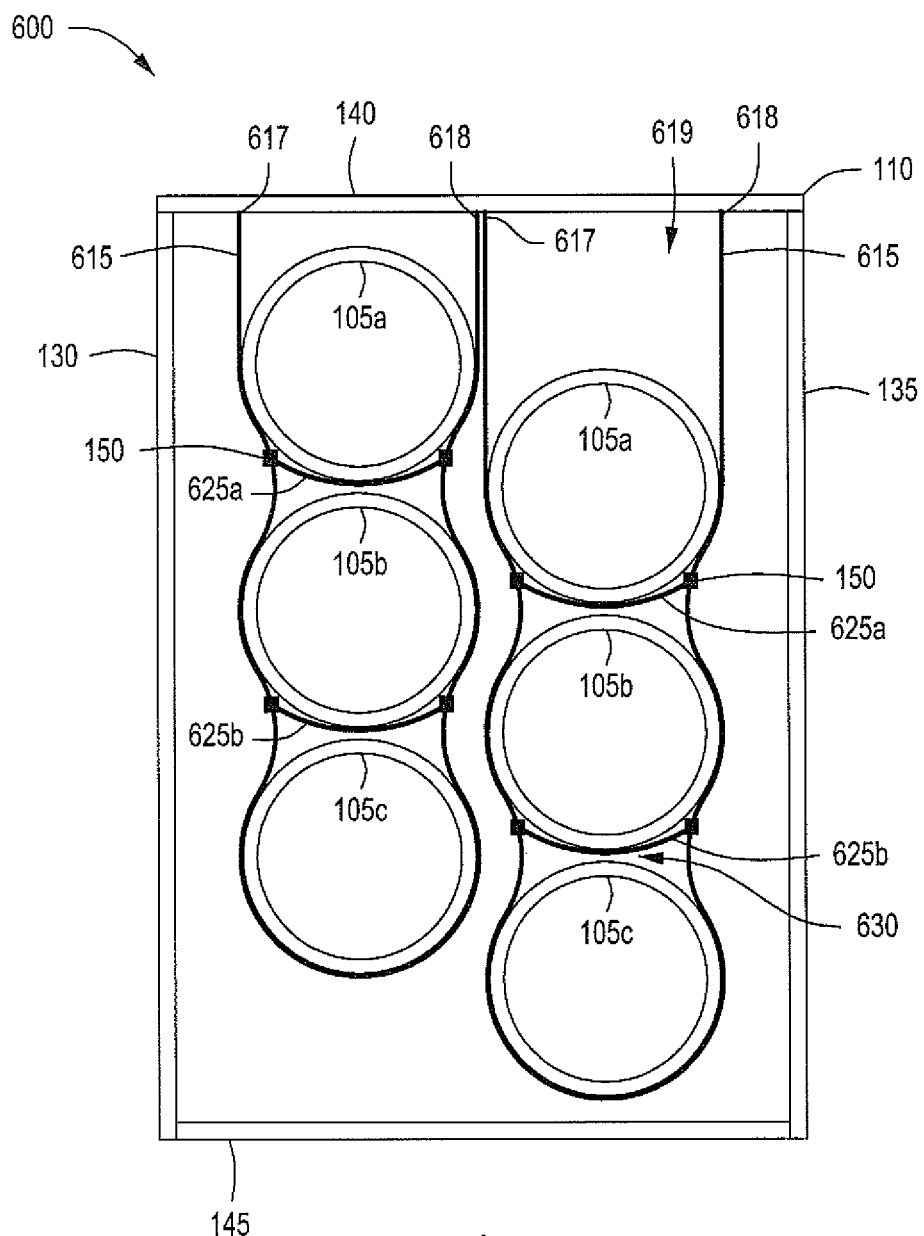
FIG. 6 depicts an end view of an illustrative support system for supporting vertically aligned rows of tubular members, according to one or more embodiments described.

FIG. 6 depicts an end view of an illustrative support system 600 for supporting one or more vertically aligned rows of tubular members 105, according to one or more embodiments. The support system 600 can include one or more support structures 110 and one or more support members 615. The support members (two are shown, 615) can be secured to the frame structure 110, and used to support one or more tubular members 105. The tubular members 105 and the frame structure 110 can be as discussed and described above with reference to FIGS. 1-5. The support members 615 can be secured to the third side 140 of the frame structure 110. The support members 615 can be similar to the support members (e.g., 116a-116h) discussed and described above with reference to FIGS. 1-5.

As illustrated, a single support member 615 can be disposed about a plurality of vertically aligned tubular members (three are shown 105a-105c). A first end 617 and a second end 618 of the support members 615 can be secured to the third side 140 of the frame structure 110 to provide a support loop 619 in which the tubular members 105a-105c can be disposed and supported.

A second support member 625 can be disposed between adjacent tubular members 105. For example, the second support member 625a can be disposed between tubular members 105a and 105b and the second support member 625b can be disposed between tubular members 105b and 105c. The second support members 625a and 625b can support each tubular member 105a and 105b disposed thereon. A gap 630 can be maintained between each second support member 625a and 625b and the tubular member 105b and 105c disposed below the second support members 625a, 625b, respectively. The third or lowermost tubular member 105c can be supported by the support member 615.

The second support members 625 can be connected to opposing sides of the support member 615, as shown. The second support members 625 can place a tension on the sides of the support member 615, such that the support member 615 is pulled or urged inwardly toward an area between two adjacently stacked tubular members 105.

The second support members 625 can be flexible, rigid, or a combination thereof. Illustrative flexible members suitable for the second support members 625 can include, but are not limited to, straps, cables, ropes, chains, wire, string, lines, or the like. For example, the second support members 625 can be a strap or rope made from a synthetic or non-synthetic material. Flexible second support members 625 can be made from materials that include, but are not limited to, polyester, nylon, polyethylene, polypropylene, para-aramid synthetic fiber (e.g., KEVLAR®), high-performance polyethylene ("HPPE"), organic fibers, metals, metal alloys, and any combinations thereof. In another example, the second support members 625 can be a metal cable that can be coated or uncoated with one or more non-metallic materials. Rigid second support members 625 can be made from materials that include, but are not limited to, pipes, rods, beams, or the like. A rigid, second support members 625 can be or include a rigid structure having a curved surface that can conform to or compliment an outer surface of the tubular member 105 supported thereon. A rigid, second support members 625 having a curved surface can include a compliant surface that can adapt/conform to an outer surface of the tubular member 105 supported thereon.

A rigid, second support members 625 can be made of a metal, metal alloy, non-metallic materials, or combinations thereof. Suitable metals and metal alloys can include, but are not limited to, steel, carbon steel, steel alloys, stainless steel, stainless steel alloys, aluminum, aluminum alloys, nickel, nickel based alloys, bronze, brass, non-ferrous metals, non-ferrous metal alloys, or combinations thereof. Suitable non-metallic materials can include, but are not limited to, carbon fiber, epoxies, fiberglass, polypropylene, polyethylene, ethylene propylene diene monomer ("EPDM"), polyurethane, blends thereof, or other polymeric materials with suitable mechanical properties. A rigid, second support members 625 can be formed using one or more molding processes including, but not limited to, pultrusion, vacuum assisted resin transfer molding ("VARTM"), vacuum infusion molding, random glass cast and/or compression molding, or any combination thereof. A rigid, second support members 625 can include a metal insert coated in one or more non-metallic materials.

The second support members 625 can be secured to the support member 615 using any suitable connector or fastening device 150. The connectors 150 have been discussed and described above with reference to FIG. 1. The connector 150 can provide an adjustable connection between the second support members 625 and the support member 615. As such, the tension provided by the second support members 625 to the two sides of the support member 615 can be increased or decreased. Furthermore, any damaged, worn, or otherwise unsuitable, second support members 625 can easily be removed and replaced, should replacement be necessary.

In one or more embodiments, one or more stabilization members 305, 320 (see FIG. 3) can be disposed about the support system 600, as discussed and described above with reference to FIG. 3.

Figure 7:
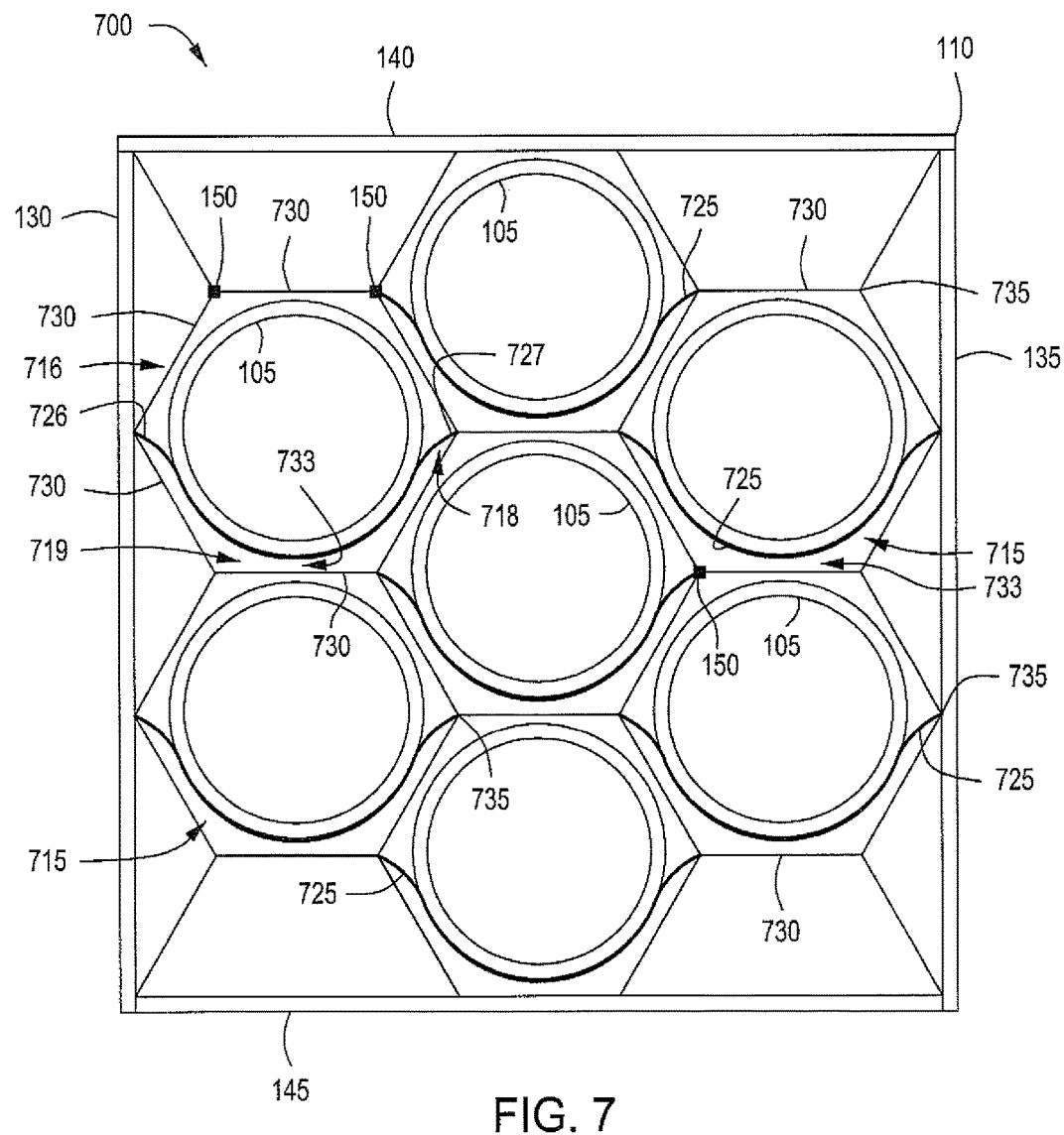
FIG. 7 depicts an end view of an illustrative support system for supporting one or more tubular members, according to one or more embodiments described.

FIG. 7 depicts an end view of an illustrative support system 700 for supporting one or more tubular members 105, according to one or more embodiments. The support system 700 can include a frame structure or frame 110 and a plurality of elongated members 730 at least partially disposed or located within the frame structure 110. The elongated members 730 can be secured or connected to one another and/or to the frame structure 110 to provide or form one or more support openings or openings 715. One or more tubular members 105 can be supported within one or more of the openings 715. The tubular members 105 and the frame structure 110 have been discussed and described above with reference to FIGS. 1-6.

As illustrated, a plurality of elongated members 730 can be oriented relative to one another and secured together to provide support openings 715 having a hexagonal shape that forms a "honeycomb" shaped structure. However, other suitable shapes can include, but are not limited to, circles, triangles, rectangles, pentagons, heptagons, octagons, or any other polygon or other geometric shape. The size or dimensions of the support openings 715 can be based, at least in part, on the size of a tubular member 105 to be disposed within the support opening 715 and/or the number of tubular members 105 to be disposed within the support openings 715. In other words, the size of the support openings 715 can be larger than the one or more tubular members 105 that can be disposed therein. The elongated members 730 can have any desired thickness to provide support openings 715 having a desired thickness, as measured from a front side to a rear side of the openings 715.

The elongated members 730 can be straps, cables, ropes, chains, wire, string, lines, rods, poles, beams, cable, plates of material, sheets of material, boards or material, or the like. In one or more embodiments, the elongated members 730 can be metal, non-metal, synthetic material, non-synthetic material, or any combination thereof. Illustrative materials can include, but are not limited to, metals, metal alloys, polyester, nylon, polyethylene, polypropylene, para-aramid synthetic fiber (e.g., KEVLAR®), high-performance polyethylene ("HPPE"), organic fibers, carbon fiber, epoxies, fiberglass, ethylene propylene diene monomer ("EPDM"), polyurethane, blends thereof, other polymeric materials with suitable mechanical properties, or any combination thereof. The elongated members 730 can be made from conducting or non-conducting materials. In one or more embodiments, the elongated member 730 can be formed using one or more molding processes including, but not limited to, pultrusion, vacuum assisted resin transfer molding ("VARTM"), vacuum infusion molding, random glass cast and/or compression molding, or any combination thereof. In at least one other example, the rigid elongated member 730 can include a metal insert coated in one or more non-metallic materials.

The elongated members 730 can have any cross-sectional shape and size. Illustrative cross-sectional shapes can include, but are not limited to, circular (e.g., a rope or cable), and rectangles (e.g., a strap). The diameter or cross-sectional length of the elongated members 730 can range from a low of about 0.25 cm, about 0.5 cm, or about 1 cm to a high of about 2 cm, about 5 cm, about 10 cm, or more than about 10 cm. For example, the width of a rectangular elongated member 730, e.g., a strap, can range from a low of about 1 cm, about 2 cm, about 3 cm, or about 4 cm to a high of about 8 cm, about 15 cm, 20 cm, about 25 cm, about 50 cm, or more than about 50 cm. The thickness of a rectangular elongated member 730, e.g., a strap, can range from a low of about 0.1 cm, about 0.15 cm, or about 1 cm, to a high of about 5 cm, about 10 cm, about 15 cm, or more than about 15 cm.

The elongated members 730 can be secured to one another at a connection point or connection joint 735 using one or more connectors or fastening devices 150. Illustrative connectors 150 have been discussed and described above with reference to FIGS. 1-6. For example, the elongated members 730 can be secured to one another via a connecting ring or loop. In another example, the elongated members 730 can have a male end and a female end, where the male end of a first elongated member 730 can be disposed in and secured to a female receiving end of a second elongated member 730. In one or more embodiments, a three way connector that connects three elongated members 730 can be disposed or located at the connection joints 735 about the hexagonally shaped support openings 715. In one or more embodiments, a four way connector that connects three elongated members 730 and a support member 725 can be disposed at any one or more of the connection joints 735 about the support opening 715. Although not shown, the connector 150 can connect any number of elongated members 730 and/or support members 725. For example, the connector 150 can connect five, six, seven, eight, nine, ten, or more than ten elongated members 730, support members 725, or combinations thereof to one another. In one or more embodiments, the elongated members 730 and/or support members 725 can be cables or straps that can be connected to one another at the connection joints 735. In one or more embodiments, the elongated members 730 and/or support members 725 can be metal chains or cables that can be connected to one another at the connection joints 735. Although not shown, the support openings 715 can be disposed within an integrally formed substrate. For example, the support openings 715 can be formed into a solid sheet of material, e.g., a fiber reinforced polymeric sheet formed by a pultrusion process. One or more openings 715 can be formed through or into the solid sheet of material.

One or more of the openings 715 can include one or more support members 725 disposed therein. The support members 725 can be secured to one or more of the elongated members 730 that form the openings 715. The one or more support members 725 can support one or more tubular members 105 within the support openings 715. As illustrated a single tubular member 105 is longitudinally disposed through each support opening 715. However, any number of tubular members 105 can be supported by the one or more support members 725. For example, each support member 725 can support one, two, three, four, or five tubular members 105. Although not shown, one or more tubular members 105 can be supported by one or more of the elongated members 730 that can be connected to one another to provide the openings 715.

One or more support members 725 can be secured to one or more sides of the support opening 715 on which one or more tubular members 105 can be supported. As illustrated, a first end 726 of a support member 725 is secured about a "left" side 716 of the support opening 715 and a second end 727 of the support member 725 is secured about a "right" side 718 of the support opening 715. The support member 725 can provide a support for one or more tubular members 105 disposed within the support opening 715. The support member 725 can also maintain or provide a gap 733 between the support member 725 and a "lower" or "bottom" side 719 of the support opening 715. As such, the support member 725 can prevent a tubular member 105 from touching or resting on the lower side 719 of a support opening 715. The support members 725 can be similar to the support straps (e.g., 116a-116h) discussed and described above with reference to FIGS. 1-6. In at least one embodiment, the support members 725 can be secured to only one elongated member 730. In another example, the support members 725 can be secured about the ends of an elongated member 730, where the elongated member connects to the two adjacent or adjoining elongated members, i.e. a connection joint 735.

In one or more embodiments, one or more stabilization members 305, 320 (see FIG. 3) can be disposed about the support system 700, as discussed and described above with reference to FIG. 3. For example, a stabilizer 305 can be disposed between the tubular member 105 and the elongated member 730 disposed above the tubular member 105. In another example, two stabilizers 305 can be disposed between the tubular member 105 and the elongated members 730 that are connected to the elongated member 730 that is disposed above the tubular member 105. In yet another example, a stabilizer 305 can be disposed between the support member 725 and the tubular member 105 or between the support member 725 and the lower side 719 of the support opening 715.

Figure 8:
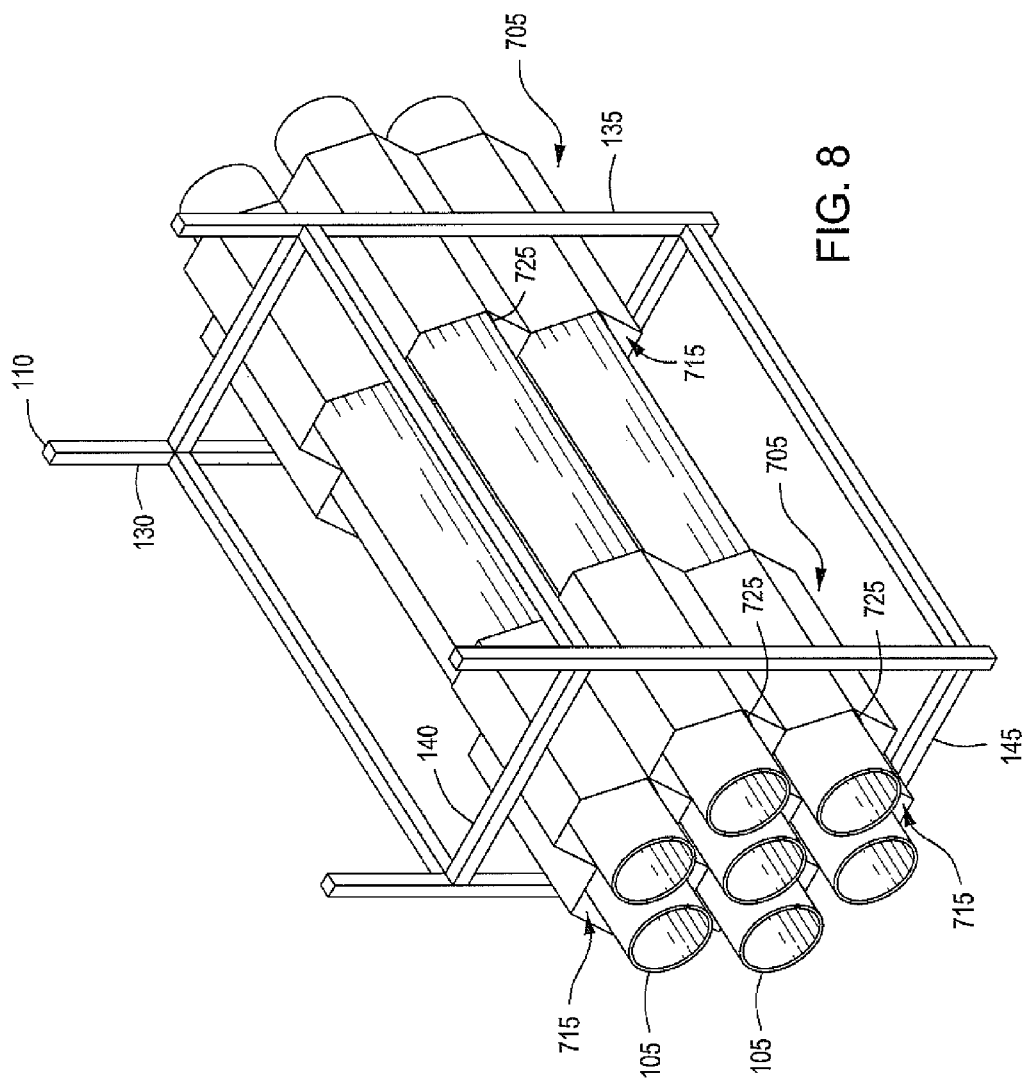
FIG. 8 depicts an isometric view of the support system depicted in FIG. 7.

FIG. 8 depicts an isometric view of the support system 700 depicted in FIG. 7. The support system 700 can include two or more support assemblies 705 (two are shown) that can have the "honeycomb" configuration or any other configuration as discussed and described above with reference to FIG. 7. As illustrated, a first support assembly 705 can be located toward the first end of the frame structure 110 and a second support assembly 705 can be located toward the second end of the frame structure 110. As such, the two support assemblies 705 can support the ends of the tubular members 105. Any number of support assemblies 705 can be disposed about the length of the tubular members 105. For example, 2, 4, 6, 8, 10, 15, 20, 30, 40, 50, 60, 70, 80, 90, 100, or more than 100 support assemblies 705 can be disposed along the longitudinal length of the tubular members 105. The spacing between any two adjacent or serially placed support assemblies 705 can be the same or can vary.

The number and spacing of the support assemblies 705 disposed about the tubular members 105 can be based, at least in part, on the number of tubular members 105, the length of the tubular members 105, the size of the tubular members 105, and/or the weight of the tubular members 105 supported in the support system 700, and/or the forces that can be expected to be directed toward the support system 700 from the environment, and other variables.

As discussed above with reference to FIG. 1, two or more tubular members 105 can be sequentially connected together to form a pipeline (not shown). The tubular members 105 can be connected using 180° bends, 90° elbows, or the like to form a pipeline. In one or more embodiments, the individual tubular members 105 and/or a pipeline formed from a plurality of tubular members 105 can carry one or more materials disposed therein. For example, the tubular members 105 and/or a pipeline formed from a plurality of tubular members 105 can carry LNG or CNG.

One or more stabilizers 320 (see FIG. 3) can be disposed between any two or more elongated members 730 and/or support assemblies 705. For example, one or more stabilizers 320 can be disposed between the first support assembly 705 located toward the first end of the frame structure 110 and the second support assembly 705 located toward the second end of the frame structure 110. One or more stabilizers 305 (see FIG. 3) can be disposed between any two or more tubular members 105. For example, one or more stabilizers 305 can be disposed between two or more tubular members 105 between any two sets of supports 705.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A system for supporting a tubular member, comprising:
    a frame having a first side that is set apart from a second side;
    a first support member having a first end and a second end that are both connected to the first side of the frame; and
    a second support member having a first end and a second end that are both connected to the second side of the frame, wherein:
        the first support member and the second support member each provide a cradle underneath a generally horizontal tubular member to support the weight of the tubular member and maintain the tubular member in a generally horizontal position,
        the first support member contacts a first bottom portion of the tubular member, whereby the entire circumference of the tubular member is not surrounded by the first support member, and
        the second support member contacts a second bottom portion of the tubular member, whereby the entire circumference of the tubular member is not surrounded by the second support member, and
        the first support member and the second support member are intended to suspend the tubular member between the first and second sides of the frame such that the tubular member makes no direct contact with the frame.

2. The system of claim 1, wherein each of the first and second ends of the first and second support members further comprise a connector disposed thereon to connect the respective support member to the frame.

3. The system of claim 2, wherein the connector provides an adjustable connection.

4. The system of claim 3, wherein the adjustable connection increases or decreases tension in the respective support member.

5. The system of claim 1, wherein the first support member and the second support member each have a rectangular cross-sectional shape having a width of about 20 cm to about 140 cm and a thickness of about 0.15 cm to about 10 cm.

6. The system of claim 1, wherein:
    the frame further comprises a third side,
    the first side opposes the second side,
    the third side is disposed between and connected to the first side and the second side,
    the first end and the second end of the first support member are disposed between the tubular member and the third side, and
    the first end and the second end of the second support member are disposed between the tubular member and the third side.

7. The system of claim 1, wherein the first end of the first support member is disposed closer to an upper end of the first side of the frame and the second end of the first support member is disposed closer to a lower end of the first side of the frame as compared to one another, and wherein each of the first end and the second end of the first support member is disposed between the tubular member and the upper end of the first side of the frame.

8. The system of claim 1, wherein:
    each of the first and second ends of the first and second support members further comprise a connector disposed thereon to connect the support member to the frame,
    at least one of the first support member and the second support member comprises a first section, a second section, and a third section connected to one another,
    the first section includes the first end, the second section includes the second end, and the third section is disposed between the first and second sections, and
    the third section is made of a different material than the first and second sections.

9. The system of claim 8, wherein the third section contacts the tubular member when the weight of the tubular member is supported by the support members.

10. The system of claim 1, wherein each support member is a strap, cable, rope, chain, wire, string, or line.

11. The system of claim 1, wherein the tubular member is adapted to store natural gas.

12. The system of claim 1, wherein the frame is an open-sided structure.

13. The system of claim 1, wherein the first and second sides of the frame comprise a solid wall.

14. The system of claim 1, wherein each of the first end and the second end of the first support member comprises a metal rod, and a flexible member is disposed between the first and second ends of the first support member and configured to support the tubular member.

15. A system for supporting tubular members, comprising:
    a frame having a first side opposing a second side;
    a first support member having a first end and a second end that are both connected to the first side of the frame; and
    a second support member having a first end and a second end that are both connected to the second side of the frame, wherein:
        the first support member and the second support member each provide a cradle underneath a generally horizontal tubular member to support the weight of the tubular member and maintain the tubular member in a generally horizontal position within the frame,
        the first support member contacts a first bottom portion of the tubular member, whereby the entire circumference of the tubular member is not surrounded by the first support member,
        the second support member contacts a second bottom portion of the tubular member, whereby the entire circumference of the tubular member is not surrounded by the second support member, and
        a longitudinal axis of the tubular member is generally parallel to the first and second sides of the frame.

16. The system of claim 15, wherein each of the first end and the second end of the first support member comprises a metal rod, and wherein a flexible member is disposed between the first and second ends of the first support member and configured to support the tubular member.

17. The system of claim 15, wherein:
the frame further comprises a third side,
the third side is disposed between and connected to the first side and the second side,
the first end and the second end of the first support member are disposed between the tubular member and the third side, and
the first end and the second end of the second support member are disposed between the tubular member and the third side.

18. A system for supporting tubular members, comprising:
an open-sided frame having at least a first side spatially separated and opposing a second side;
a first support member having a first end and a second end that are both connected to the first side of the frame; and
a second support member having a first end and a second end that are both connected to the second side of the frame, wherein:
the first support member and the second support member each provide a cradle underneath a generally horizontal tubular member to support the weight of the tubular member and maintain the tubular member in a generally horizontal position within the frame and between the first and second sides, whereby a longitudinal axis of the tubular member is generally parallel to the first and second sides of the frame,
the first support member is configured to support a first end of the tubular member and the second support member is configured to support a second end of the tubular member,
the first support member contacts a first bottom portion of the tubular member, whereby the entire circumference of the tubular member is not surrounded by the first support member, and
the second support member contacts a second bottom portion of the tubular member, whereby the entire circumference of the tubular member is not surrounded by the second support member.

19. The system of claim 18, wherein:
the frame further comprises a third side disposed between and connected to the first side and the second side,
the first end and the second end of the first support member are disposed between the tubular member and the third side,
the first end and the second end of the second support member are disposed between the tubular member and the third side, and
the tubular member is configured to contain natural gas.

20. The system of claim 18, wherein the system is configured to rest on a ship.

21. The system of claim 1, wherein the first end of the first support member comprises a first metal rod having a first end connected to the first side of the frame and a second end connected to a first end of a strap and the second end of the first support member comprises a second metal rod having a first end connected to the first side of the frame and a second end connected to a second end of the strap to provide a support member having three independent sections.

22. The system of claim 1, wherein:
the first support member comprises a first section, a second section, and a third section,
the first section is connected to a first end of the second section,
the third section is connected to a second end of the second section,
the first section and the third section each have a circular cross-section,
the second section has a rectangular cross-section,
the second section contacts the tubular member, and
the first section and the third section are not in contact with the tubular member.

23. The system of claim 1, wherein:
the frame further comprises a third side,
the first side opposes the second side,
the third side is disposed between and connected to the first side and the second side,
the frame is disposed on a surface,
the surface is a deck of a ship, a floor of a cargo hold of a ship, a truck bed, a train car bed, or a ground,
the third side is opposite the surface,
the tubular member is disposed between the third side and the surface,
the first end of the first support member is disposed closer to the third side of the frame than the second end of the first support member, and
both the first end of the first support member and the second end of the first support member are disposed closer to the third side of the frame than the cradle provided by the first support member.

24. The system of claim 1, wherein the frame is disposed on a surface, wherein at least a portion of the cradles provided by the first support member and the second support member are located between the tubular member and the surface, and wherein the tubular member is located between the surface and the first and second ends of the first support member.

25. The system of claim 7, wherein the tubular member has a diameter, and wherein a distance between the first end of the first support member and the second end of the first support member is about equal to the diameter of the tubular member.

26. The system of claim 1, wherein the first side of the frame is opposite the second side of the frame and a diameter of the tubular member is disposed between the first and second sides.

27. The system of claim 1, wherein each first and second support member is an elongated and flexible strap, rope, string, cable or wire.

28. The system of claim 1, wherein the longitudinal axis of the tubular member is generally parallel to a longitudinal axis of both the first and second sides of the frame.

29. The system of claim 14, wherein the longitudinal axis of the tubular member is generally parallel to a longitudinal axis of both the first and second sides of the frame.

30. The system of claim 18, wherein the longitudinal axis of the tubular member is generally parallel to a longitudinal axis of both the first and second sides of the frame.

* * * * *